3,220,451
DEHULLING SOYBEANS
Walter F. Bollens and Howard F. Kruse, Chicago, Ill., assignors to Swift & Company, Chicago, Ill., a corporation of Illinois
No Drawing. Filed July 11, 1962, Ser. No. 209,249
9 Claims. (Cl. 146—27)

The present invention relates in general to an improved conditioning treatment of soybeans. More particularly, this invention is directed to a method for conditioning soybeans whereby dehulling is facilitated and a high protein, low fiber content soybean meal can be prepared.

Soybean meal is being used in increasing quantities in animal feeds, particularly in feed for fowl where low fiber content is important. With this increased use, there is an increasing demand for a high protein, low fiber meal. A meal made from beans having a higher proportion of the hull material removed will have a decreased amount of fiber and a higher protein content.

However, the soybean industry has encountered difficulties in the dehulling of soybeans. The biggest problem in dehulling is to prevent hull particles from adhering to the kernels when the beans are cracked. Some processes resort to soaking of the beans, or some manner of treatment with moisture (for example, steaming) to loosen the hulls. This moisture treatment is objectionable in that the beans must be washed to remove the loosened hulls and then retreated and rewashed a number of times to effect complete hull removal. If and when the hulls are completely removed, the kernels must then be dried, thus involving a separate operation with added expense. Other processes utilize a relatively lengthy cooking operation (usually in water or in oil) wherein the beans may be subjected to high temperatures and pressures. This treatment is objectionable for a number of reasons including nutritional impairment of the soybean protein and damage to the soybean oil.

Another method of conditioning soybeans for dehulling in use today involves a drying process in which soybeans are heated slowly by means of hot air (150–180° F.) to relatively low temperatures of about 120°–140° F. The beans are permitted to cool, which requires 30 minutes to a few hours, and then given a necessary storage period of about one to two weeks prior to cracking of the beans and removal of the hulls. While this is a reasonably effective method, it requires segregated storage facilities and increased handling, and it is found that even cracking the beans so treated does not loosen all of the hulls and pieces of the hulls often remain stuck to the kernel.

Still another method of conditioning the soybeans prior to cracking and hull removing comprises slowly raising the temperature of the soybeans by means of hot air (180–250° F.) to an average temperature of between about 160°–225° F. for a heating period of an hour or more and lowering the temperature of the beans to about 80° F. within a few hours after heating. While this process is indeed an improvement over the state of the art, it still has several disadvantages. For example, when the entire bean is raised to an excessive temperature, e.g., about 200–225° F., there is almost always an adverse effect on the quality of the oil which is recovered in the subsequent extraction process. Furthermore, by heating the entire bean, the moisture content is excessively decreased. Moisture must then be re-incorporated to permit satisfactory flaking for optimum extraction. Also a direct cooling step is required in this method of conditioning the beans for dehulling.

It is therefore an object of this invention to provide a method of conditioning soybeans for dehulling wherein the oil is not adversely affected nor is the moisture content decreased an appreciable amount.

Another object of this invention is to provide a method of conditioning soybeans such that the hulls will become loosened and will separate cleanly from the kernels.

A further object of this invention is to provide a method for dehulling soybeans such that meal made therefrom possesses a high protein content, of at least 50%, and a low fiber content, less than about 3% by weight.

Additional objects, if not specifically set forth herein, will be readily apparent to those skilled in the art from the detailed description of the invention which follows.

In general, it has been found that the dehulling of soybeans can be greatly improved by conditioning the soybeans prior to cracking and dehulling. This conditioning step comprises exposing the soybeans to an atmosphere whose temperature is controlled in the range of about 300–1,000° F. for a period of time wherein the soybeans only absorb enough heat to raise the temperature of the hulls to a temperature range of about 250–600° F. and wherein the internal temperature of the soybeans is not materially affected, i.e. raised above about 160° F. When treated in this manner, the hulls become loosened and separate cleanly from the kernels.

More specifically, the soybeans are exposed to an atmosphere of relatively dry hot gases, to raise the temperature of the hulls, for the desired period of time which is usually up to about one minute. While the time and temperature ranges will vary, depending upon the type and size of the beans, the moisture content, etc., it has been found that contacting the beans for about 30 seconds in an atmosphere of about 300–400° F. gives the optimum results.

A variety of heating devices operating at vairous temperatures can be employed for raising the temperature of the soybean hulls. For example, short contact with very hot air will do a job comparable to a longer contact with hot air at a lower temperature. However, it is obviously uneconomical to use a higher temperature than necessary. At this point it should be mentioned that the low exposure time, even with exceedingly high temperature, prevents any adverse affect on the quality of the oil which is recovered in the subsequent extraction process. Furthermore, the beans do not dry out to any appreciable extent.

The process of this invention comprises the exposing of the soybeans to an atmosphere of hot gases at a temperature between about 300 to 1,000° F. for a time period so that only the hulls are heated to about 250–600° F. Of course, the hulls of all the beans do not necessarily reach the same temperature. However, this is immaterial as long as the temperature of the hulls of all the beans reach the temperature of between about 250–600° F. In practicing the invention, the beans are exposed to hot gases such as hot air, inert or combustion gases. Due to the construction of various types of systems, there will be variations in the temperatures to which the hulls are heated caused by unequal amounts of hot air contacting some of the beans and differences in the hot air temperatures in various sections of the system caused by uninsulated parts, through which the air passes relative to the beans. Thus, when operating in a heating apparatus, it is probable that the temperature will not be uniform and will vary to a great extent. While more expensive heating devices would allow substantially uniform heating of the hulls, they are not required.

Temperatures above 1,000° F. can be used but with no appreciable increase in the dehulling efficiency and of course, at the added cost of producing the higher temperatures. While the hulls of the beans are small in volume as compared to the kernels and consequently little heat is transferred from the hulls to the kernels, nevertheless, it is possible to heat at excessive temperatures whereby the internal temperature is raised appreciably causing moisture removal and possible damage to the kernel. Therefore when exposing the beans it is preferred to raise the temperature of the hot gases to a temperature not exceeding about 1,000° F.

The process is not restricted to any certain type of heating system. A rising column of soybeans which is kept in a fluidized condition in a stream of hot gases is quite satisfactory. Also, the soybeans can be caused to fall freely through a hot gaseous atmosphere. A fluidized column of soybeans moving downwardly through a rising stream of hot gases will also work. Additionally, conveying the beans in a closed system using a stream of hot gases as the driving force will result in a condition wherein the hulls become loosened to an extent that they can be readily separated in the dehulling operation.

After exposing the beans to the hot gaseous atmosphere, they may be cooled prior to the cracking and dehulling operation. However, since only the hull has been heated, the time required for cooling is short. Usually, one minute is sufficient. Shorter times such as 30 seconds are also satisfactory. If it is desired to cool the beans, any effective method may be used. For example, by moving the beans through a stream of air at ambient temperature.

After exposing the beans to the hot gaseous atmosphere, and cooling, they are usually immediately delivered to the dehulling equipment. The hulls are preferably removed by cracking the beans and dehulling by air aspiration or suction. The cracking and dehulling operations are well known in the art.

Soybeans as received usually contain 10 to 15% moisture. Normally, when operating under the conditions of the process of this invention, the soybeans will be reduced in a moisture content approximately 0.5–2.0% by weight, after the heat treatment and prior to dehulling. While the exposure of the beans to a hot gaseous atmosphere results in some drying this alone is not sufficient to loosen the hulls so that they will separate cleanly from the kernels. The kernel itself can be quite moist if the hull is dry and fragile. Accordingly, the invention should not be limited to reducing the moisture content as the temperature differential between the kernel and the hull appears to be the essential feature.

Like the cracking and dehulling operation, the oil removal procedure to be employed is conventional. The oil is removed either by mechanical means or by solvent extraction. However, due to the heat exposure process of this invention, the subsequent soybean meal will have a protein content of more than 50%, and will contain less than 3% fiber by weight. Furthermore, the extracted oil will be of good quality.

The following examples are set forth for the purposes of illustration only and are not to be construed as limiting the scope of the invention in any way as defined in the appended claims.

*Example I*

Soybeans, having a moisture content of about 10.3% were exposed to a heat treatment at atmospheric pressure by means of a rising column of soybeans kept in a fluidized condition in a stream of hot gases. The input temperature of the hot gas was about 375° F. and the exhaust temperature about 290° F. The beans were subjected to the treatment for about one minute and the temperature of the hulls reached 250° F. The beans, whose moisture content was now 9.8%, were then immediately cooled to about 100° F. and conveyed to the dehulling equipment where they were cracked and the hulls removed by screening and air aspiration. After dehulling, the oil was removed by solvent extraction. The soybean meal analyzed 51% protein, 12.0% moisture, 2.86% fiber and 1.0% oil. The extracted oil had a bleached color of 1.2 red, a free fatty acid content of .6% and a refining loss of 4.0%.

*Example II*

Fresh soybeans, screened to remove trash, were conveyed in a closed system using a stream of hot gases as the driving force. The input temperature of the gas was approximately 1,000° F. and the exhaust temperature about 750° F. The beans were subjected to the treatment for about 10 seconds and the temperature of the hulls reached about 600° F. The moisture content was reduced from 12.5 to 11.0%. The beans were then cooled and conveyed to the cracking rolls and dehulled by cracking and air aspiration. The oil was then removed by solvent extraction. This oil had a bleached color of 1.3 red, a free fatty acid content of 0.6% and a refining loss of 3.9%. The meal analyzed 50.5% protein, 2.95% fiber, and 12.0% moisture, and 1.1% oil.

*Example III*

Soybeans, having a moisture content of about 15% were contacted with a rising stream of hot air having an input temperature of about 600° F. and an exhaust temperature of 400° F. The beans were exposed for about 30 seconds and the hulls reached a temperature of about 340° F. The moisture content was reduced to 13%. The beans were cooled and promptly conveyed to the cracking rolls, and cracked. The hulls were removed by screening and by suction and the oil extracted. The oil had a bleached color of 1.2 red, a fatty acid content of 0.6% and a refining loss of 4.0%. The soybeans analyzed 50.1% protein, 3.0% fiber, 12.1% moisture, and 1.0% oil.

In all cases the hulls became fragile, cracked easily, and separated cleanly from the kernels.

It is apparent that many modifications and variations of the invention as hereinbefore set forth may be made without departing from the spirit and scope thereof. The specific embodiments described in the examples are given by way of illustration only and the invention is limited only by the terms of the appended claims.

We claim:

1. A method of treating soybeans comprising: contacting the beans with a relatively dry gaseous atmosphere having a temperature above about 300° F. for a period of time sufficient to heat the hulls without materially raising the internal temperature of the beans, cooling the beans, and removing the hulls.

2. A method of treating soybeans comprising: contacting the beans with a relatively dry gaseous atmosphere having a temperature between about 300 to 1,000° F. for a period of time sufficient to heat the hulls without materially raising the internal temperature of the beans, cooling the beans, and removing the hulls therefrom.

3. The method of claim 2 wherein the period of time is up to about one minute.

4. A method of treating soybeans comprising: contacting the beans with a relatively dry gaseous atmosphere having a temperature between 300 to 400° F. for a period of time sufficient to heat the hulls without materially raising the internal temperature of the beans, cooling the beans, and removing the hulls.

5. A method for dehulling soybeans which comprises: subjecting soybeans to a relatively dry gaseous atmosphere having a temperature of at least about 300° F. for a period of time sufficient to heat only the hulls to a temperature of between about 250 to 600° F. and thereafter cooling and cracking the beans and removing the hulls therefrom.

6. The method of claim 5 wherein the temperature of the gaseous atmosphere is between 300 and 400° F. and the temperature period is less than one minute.

7. A method for dehulling soybeans which comprises: subjecting soybeans to a relatively dry gaseous atmosphere having a temperature of at least about 300° F. for a period of time sufficient to heat only the hulls to a temperature of between about 250 to 600° F. and thereafter cooling and cracking the beans and removing the hulls therefrom by screening and air aspiration.

8. A method of dehulling soybeans which comprises: subjecting soybeans to a relatively dry gaseous atmosphere having a temperature of at least about 300° F. for a period of time sufficient to heat only the hulls to a temperature of between about 250 to 600° F. and thereafter cooling and cracking the beans and removing the hulls therefrom by screening and air suction.

9. A method of treating soybeans comprising: contacting the beans with a relatively dry gaseous atmosphere having a temperature between about 300 to 1,000° F. for a period of time sufficient to heat the hulls without materially raising the internal temperature of the beans, and removing the hulls therefrom.

References Cited by the Examiner

UNITED STATES PATENTS

| | | | |
|---|---|---|---|
| 117,271 | 7/1871 | Fitts | 146—221.7 X |
| 675,422 | 6/1901 | Stanley | 99—2 |
| 791,473 | 6/1905 | Kellogg et al. | 146—221.8 |
| 994,088 | 5/1911 | Willis et al. | 99—2 |
| 1,136,597 | 4/1915 | Friend et al. | 146—221.8 |
| 1,753,902 | 4/1930 | Nevills | 146—227 X |
| 1,948,884 | 2/1934 | Patterson | 146—229 X |
| 2,004,497 | 6/1935 | Bajda | 146—229 X |
| 2,579,245 | 12/1951 | Steiner | 146—221.7 X |
| 3,058,829 | 10/1962 | Kovasvay et al. | 146—302 X |

J. SPENCER OVERHOLSER, *Primary Examiner.*

BEATRICE H. STRIZAK, *Examiner.*